United States Patent [19]
Kuenzel et al.

[11] Patent Number: 5,346,425
[45] Date of Patent: Sep. 13, 1994

[54] APPARATUS AND METHOD FOR FILLING TUBULAR CASTINGS

[75] Inventors: Udo Kuenzel, Johannisberg; Friedrich Geiss, Wiesbaden; Arno Romeike, Taunusstein, all of Fed. Rep. of Germany

[73] Assignee: Hoechst Aktiengesellschaft, Frankfurt am Main, Fed. Rep. of Germany

[21] Appl. No.: 934,238

[22] Filed: Aug. 25, 1992

[30] Foreign Application Priority Data

Aug. 30, 1991 [DE] Fed. Rep. of Germany ... 9110734[U]

[51] Int. Cl.$^5$ ............................................. A22C 11/02
[52] U.S. Cl. ...................................................... 452/38
[58] Field of Search ...................................... 452/38, 37

[56] References Cited

U.S. PATENT DOCUMENTS

| Re. 30,265 | 5/1980 | Kupcikevicius et al. | 452/38 |
|---|---|---|---|
| 4,034,441 | 7/1977 | Kupcikevicius et al. | 17/41 |
| 4,202,075 | 5/1980 | Michel et al. | 17/41 |
| 4,292,711 | 10/1981 | Becker | 17/49 |
| 4,430,772 | 2/1984 | Michel et al. | 17/33 |
| 4,512,059 | 4/1985 | Beckman | 17/45 |
| 4,528,719 | 7/1985 | Frey | 452/38 |
| 4,535,508 | 8/1985 | Aceto | 17/49 |
| 4,599,764 | 7/1986 | Knepshield | 452/38 |
| 4,608,730 | 9/1986 | Kupcikevicius et al. | 452/38 |
| 4,683,617 | 8/1987 | Raudys | 17/41 |
| 4,727,624 | 3/1988 | Stanley | 17/41 |

FOREIGN PATENT DOCUMENTS

| 105446 | 4/1984 | European Pat. Off. . |
|---|---|---|
| 126474 | 11/1984 | European Pat. Off. . |
| 133573 | 2/1985 | European Pat. Off. . |
| 0207234 | 1/1987 | European Pat. Off. . |
| 1565355 | 4/1980 | United Kingdom . |
| 2100571 | 1/1983 | United Kingdom . |
| 2109219 | 6/1983 | United Kingdom . |

*Primary Examiner*—Willis Little
*Attorney, Agent, or Firm*—Foley & Lardner

[57] ABSTRACT

An apparatus for filling tubular casings includes a filling tube having a locking device, the locking device including at least one locking element, and a calibrating ring that is lockable on the filling tube. A method for filling a tubular casing includes the steps of mounting a gathered casing stick on a filling tube, sliding a calibrating ring onto the filling tube, locking the calibrating ring on the filling tube, drawing the start of the gathered casing stick over the calibrating ring, introducing the filling material into an extruder, and pressing the filling material through the filling tube and into the tubular casing.

17 Claims, 6 Drawing Sheets

APPARATUS AND METHOD FOR FILLING TUBULAR CASTINGS

BACKGROUND OF THE INVENTION

The invention relates to an apparatus and method for filling tubular casings with pasty filling material, especially for the filling of synthetic sausage casings with sausage mass.

The overall appliance for filling tubular casings with pasty filling material includes an extruder which presses the filling material through a filling tube into the tubular casing. The casing to be filled is arranged in gathered form as a so-called concertina on the filling tube and is ungathered by the pressed-in filling material and drawn off from the filling tube. To fill the casing with the filling material tautly and in a crease-free manner, it is necessary to delay the draw-off of the casing from the filling tube by means of a brake. The brake is located in the vicinity of the filling-tube orifice and presses the ungathered tubular casing against the outer face of the filling tube with adjustable force.

It has been shown to be especially expedient if the gathered casing is located on a hollow-cylindrical core. This hollow-cylindrical core can, together with the gathered casing located on it, be pushed onto the filling tube and, after the casing has been removed completely, also easily removed. Conventionally, these casings gathered on a core have a so-called calibrating ring, over which the casing is drawn before the filling and which serves for expanding the casing to a constant diameter. See, for example, the following documents: U.S. Pat. No. 4,202,075; U.S. Pat. No. 4,292,711; DE-A-3,242,147; EP-A-0,105,446; EP-A-0,126,474; EP-A-0,133,573; GB-A-1,565,355; GB-A-2,100,571. The calibrating ring is either an integral component of the core or is attached to the core.

One disadvantage of these known appliances is that problems arise during the elimination of waste. The casings are gathered on the core directly from the manufacturer and the core together with the casing is put on the market. The customer (sausage manufacturer) pushes the composite core/concertina structure onto the filling tube of the filling machine and fills the casing which is ungathered continuously and is drawn off from the core. Finally, only the core still remains on the filling tube, and this is removed and replaced by another cartridge (composite core/concertina structure). The core, usually made of plastic, remains as waste.

SUMMARY OF THE INVENTION

One object of the invention is to eliminate or at least mitigate this waste problem.

This object is achieved by providing a filling tube which has a removable calibrating ring lockable on the filling tube.

The instant invention includes an apparatus for filling tubular casings, comprising a filling tube having a locking device, the locking device including at least one locking element, and a calibrating ring that is lockable on the filling tube.

The locking element of the apparatus further comprises a bead, a locking shoulder, and a locking groove.

The calibrating ring further comprises at least one locking tab and at least one guide tab.

Additionally, the apparatus of the invention is comprised of an extruder connected to one end of the filling tube.

The invention also includes an apparatus for receiving filling material from a filling tube. This apparatus is comprised of a calibrating ring having at least one locking tab and at least one guide tab, the calibrating ring being lockable on the filling tube, and a gathered tubular casing that is fitted over the calibrating ring.

The instant invention further describes a method for filling a tubular casing. This method comprises the steps of mounting a gathered casing stick on a filling tube, sliding a calibrating ring onto the filling tube, locking the calibrating ring on the filling tube, drawing the start of the gathered casing stick over the calibrating ring, introducing the filling material into an extruder, and pressing the filling material through the filling tube and into the tubular casing.

BRIEF DESCRIPTION OF THE DRAWINGS

The invention is explained in more detail below by means of FIGS. 1 to 8, which are expressly made a part of this specification.

DETAILED DESCRIPTION OF THE PREFERRED EMBODIMENTS

Figure 1:
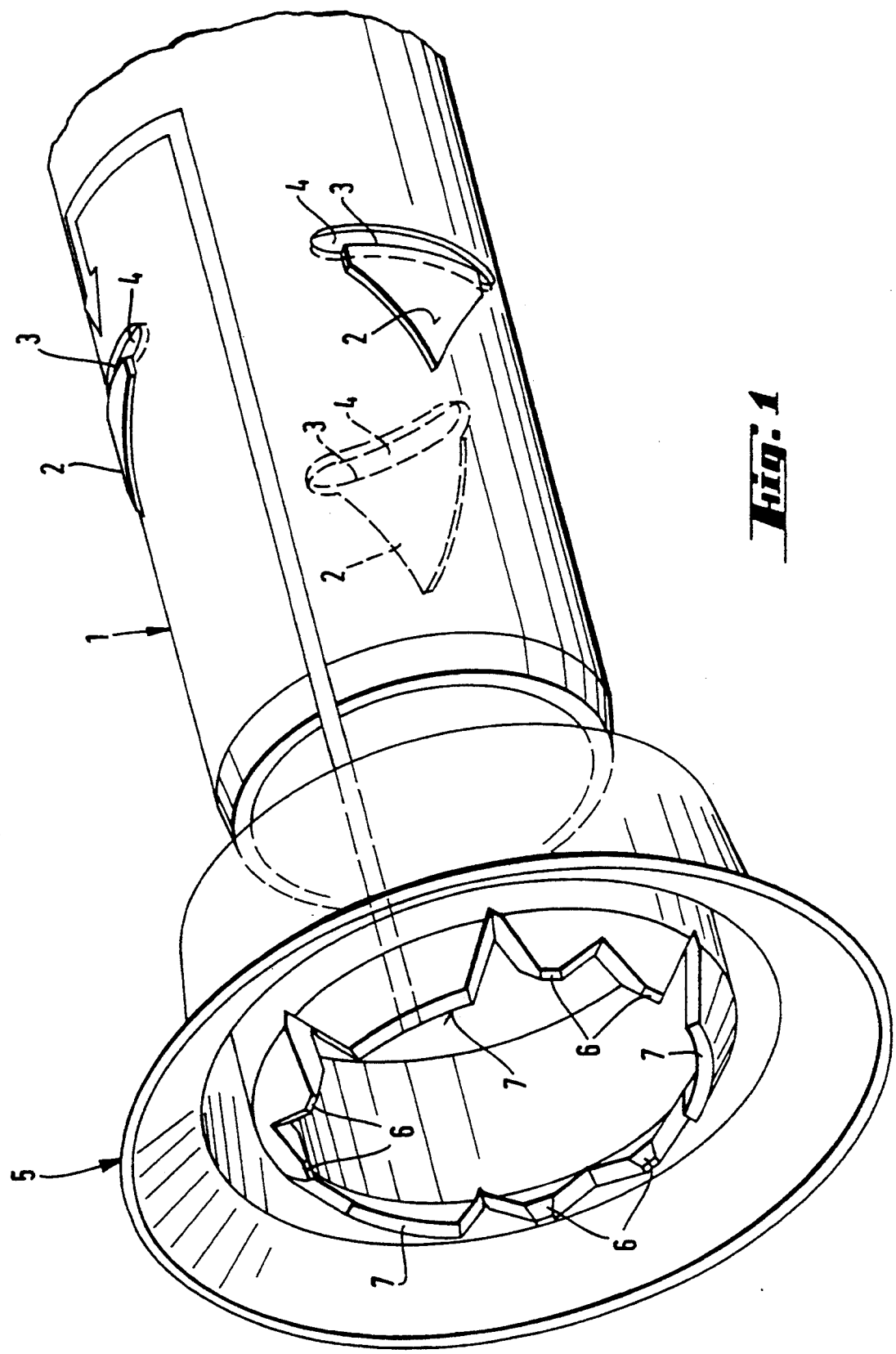
FIG. 1 shows a general perspective view of part of the filling tube and of the calibrating ring, the ring not yet being pushed onto the filling tube.
Figure 2:
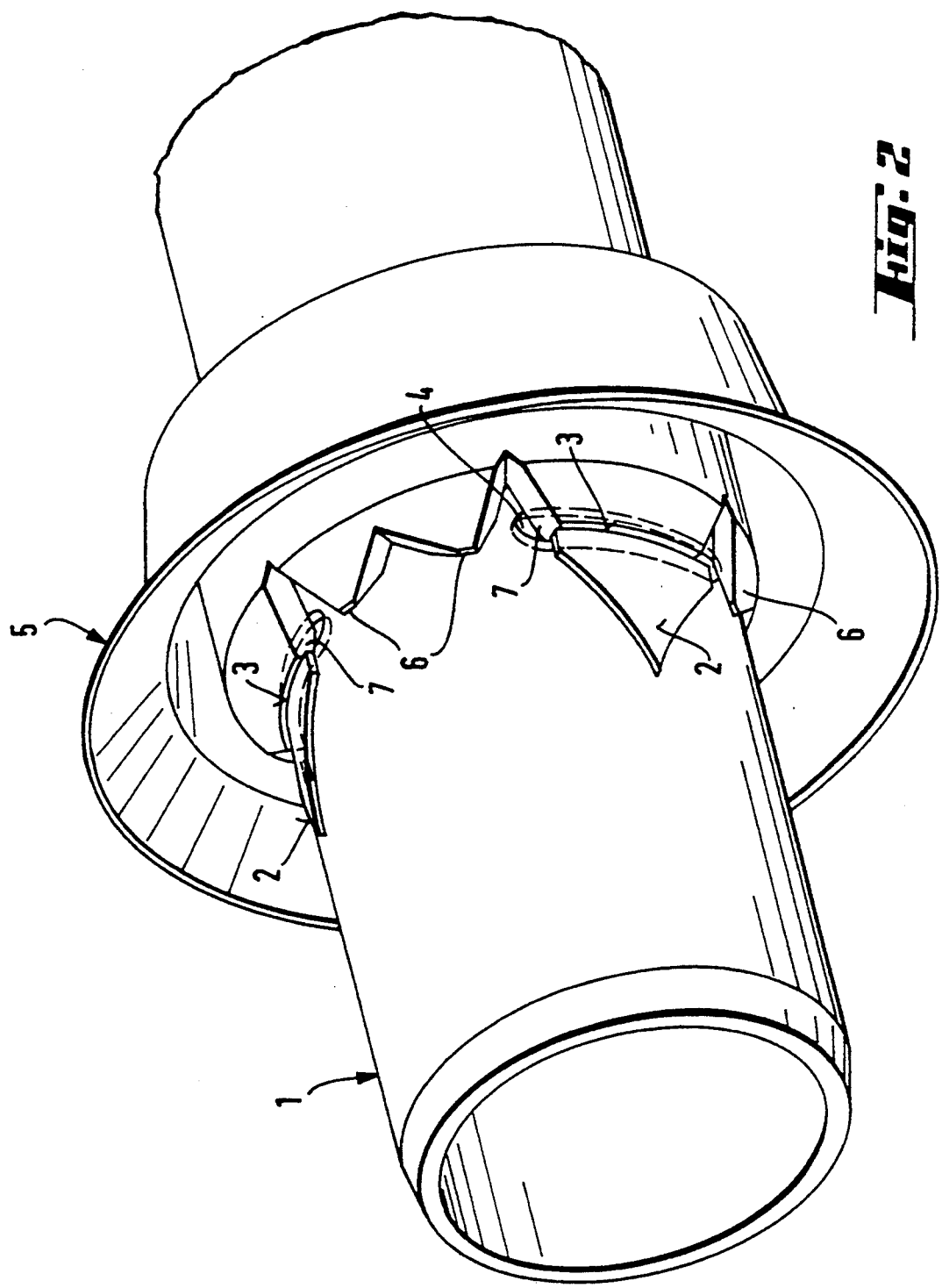
FIG. 2 shows a perspective view like that of FIG. 1, but with a calibrating ring locked on the filling tube.
Figure 3:
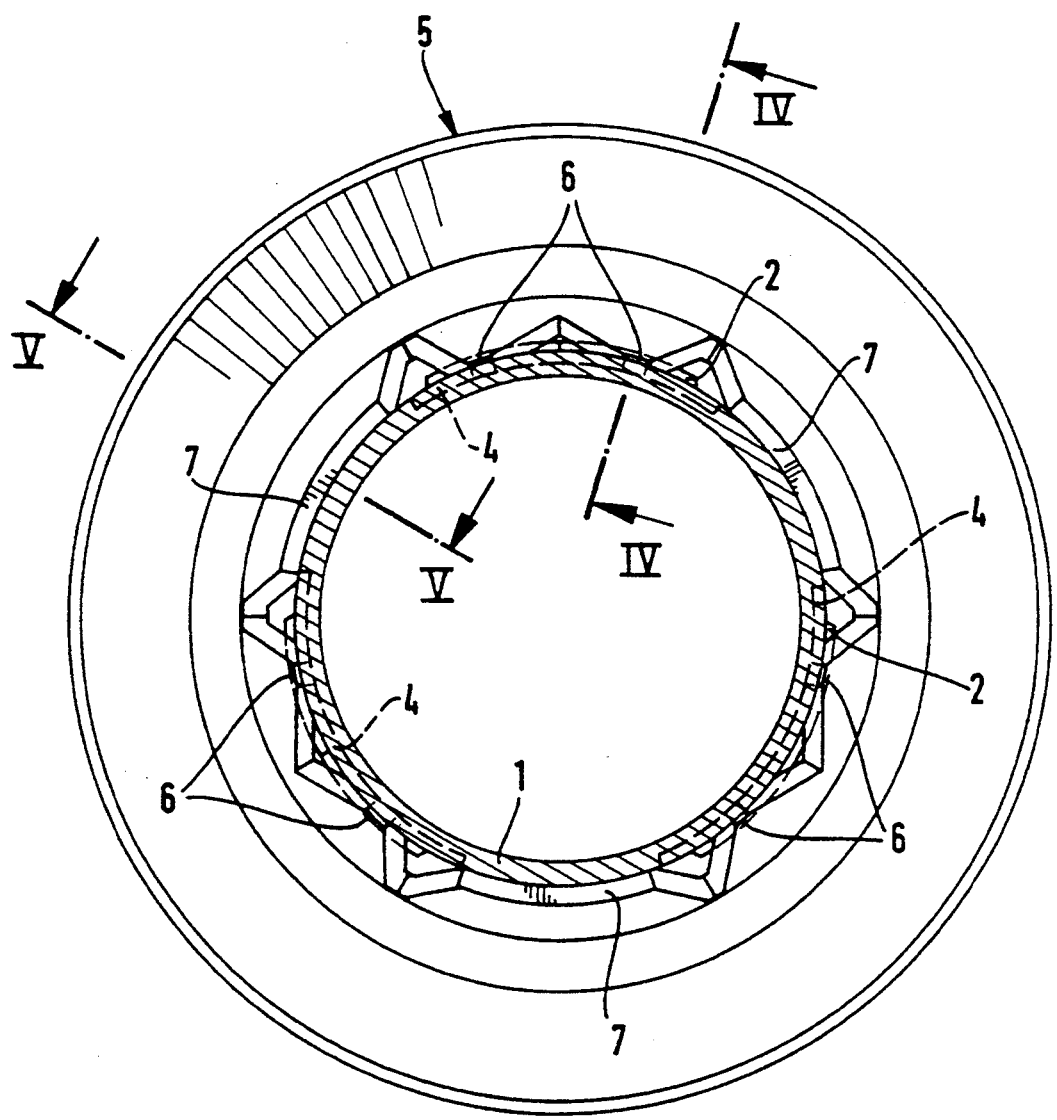
FIG. 3 shows an end view of the calibrating ring together with the filling tube in an angular position relative to one another.
Figure 4:
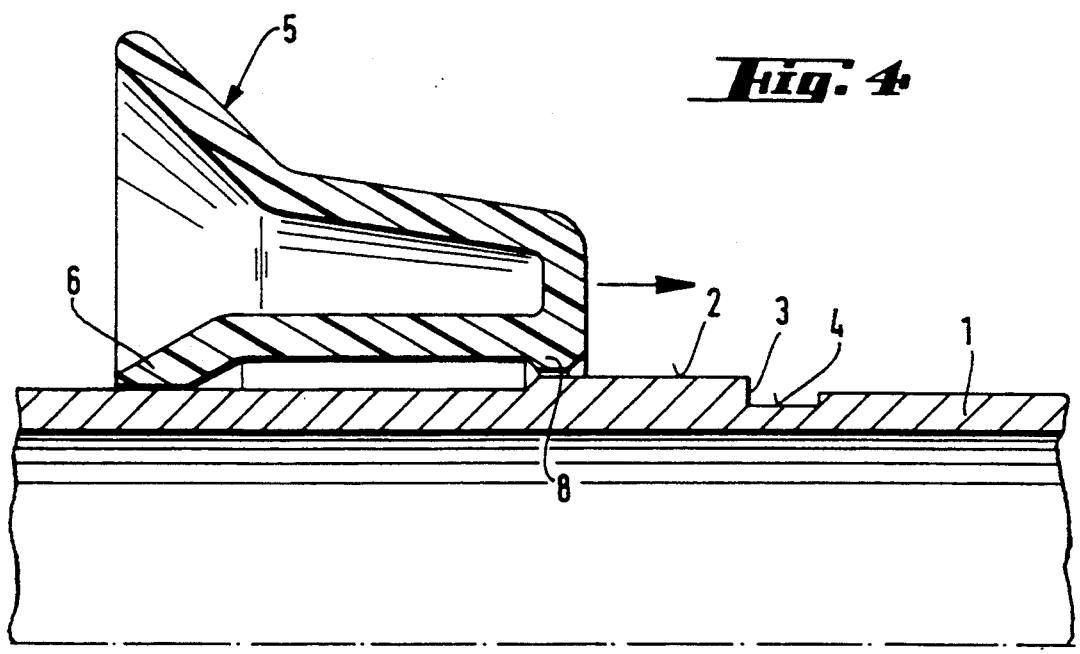
FIG. 4 shows a section along the line IV—IV in FIG. 3.
Figure 5:
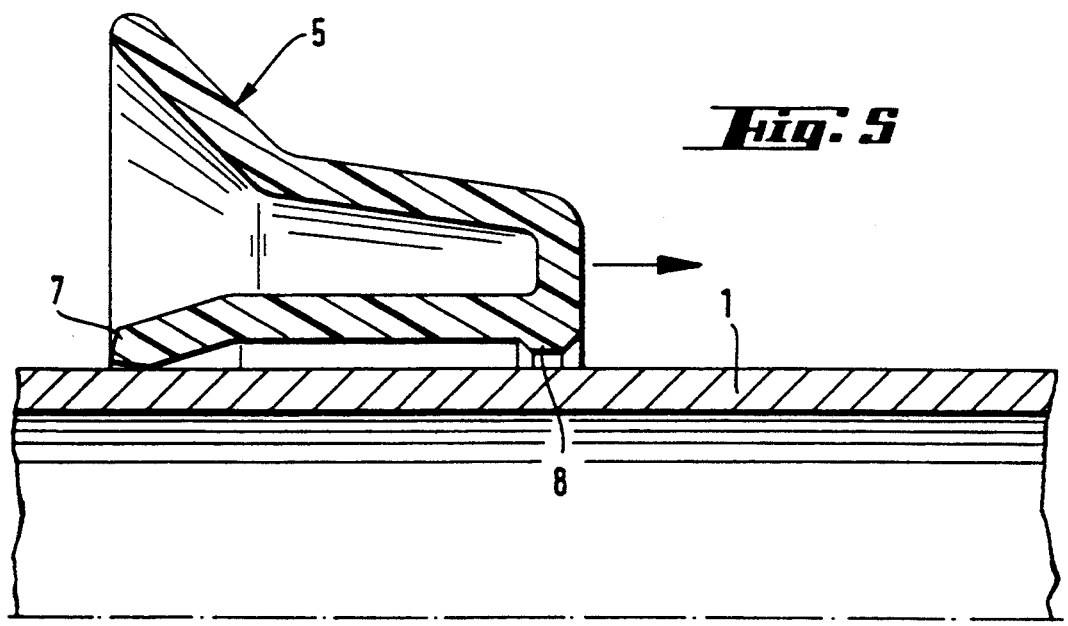
FIG. 5 shows a section along the line V—V in FIG. 3.
Figure 6:
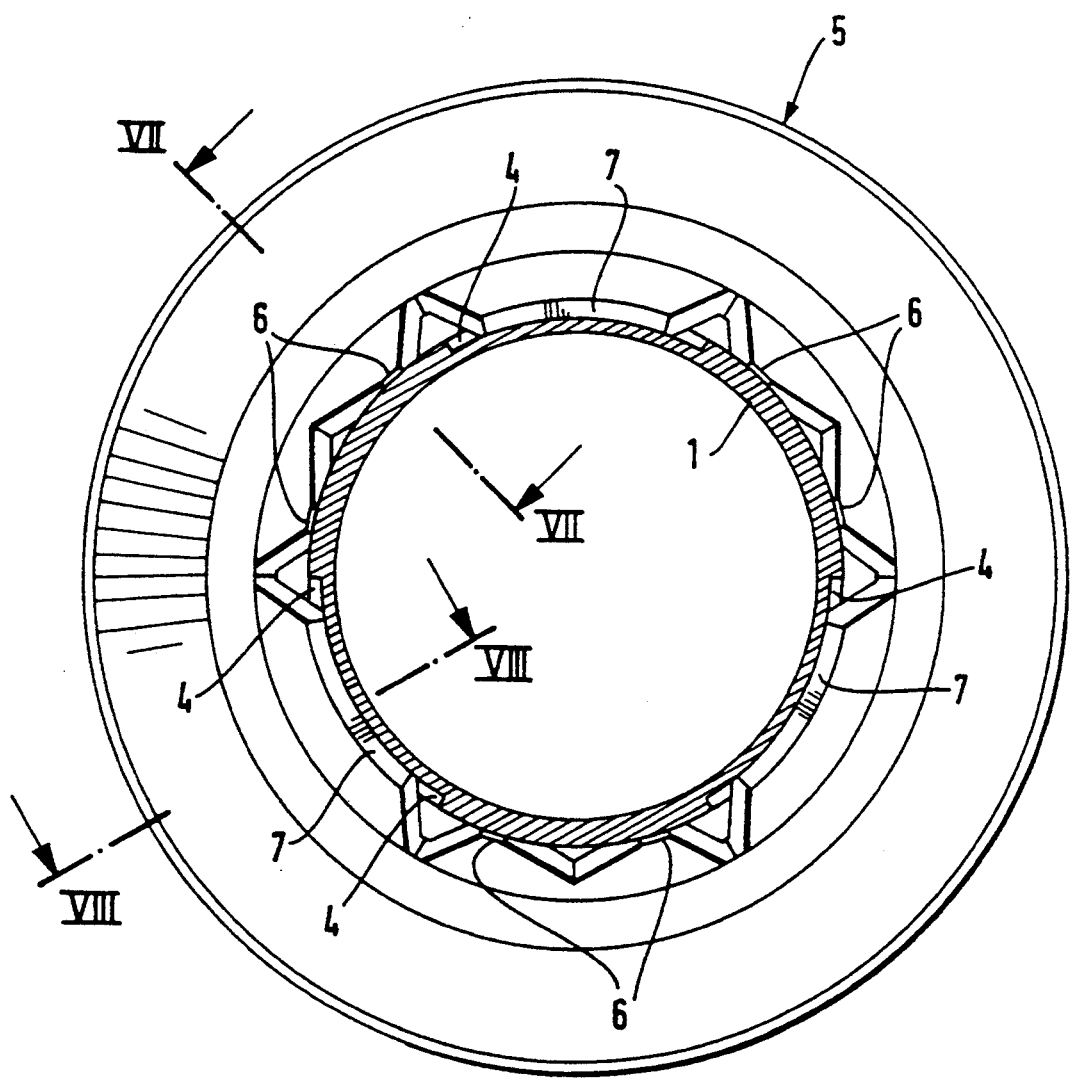
FIG. 6 shows an end view like that of FIG. 3, but in the locked position.
Figure 7:
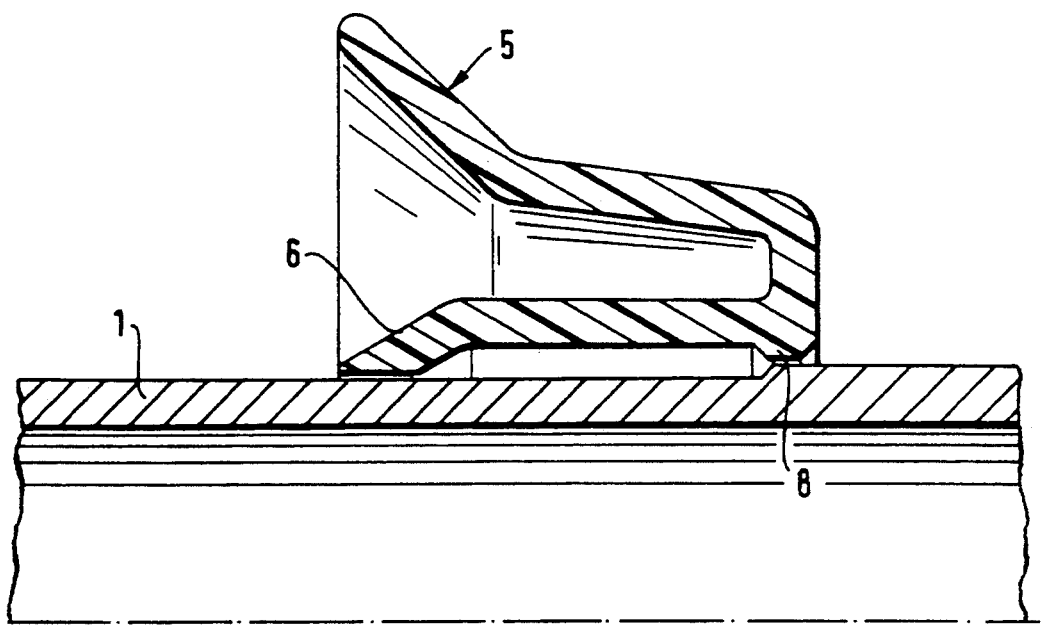
FIG. 7 shows a section along the line VII—VII in FIG. 6.
Figure 8:
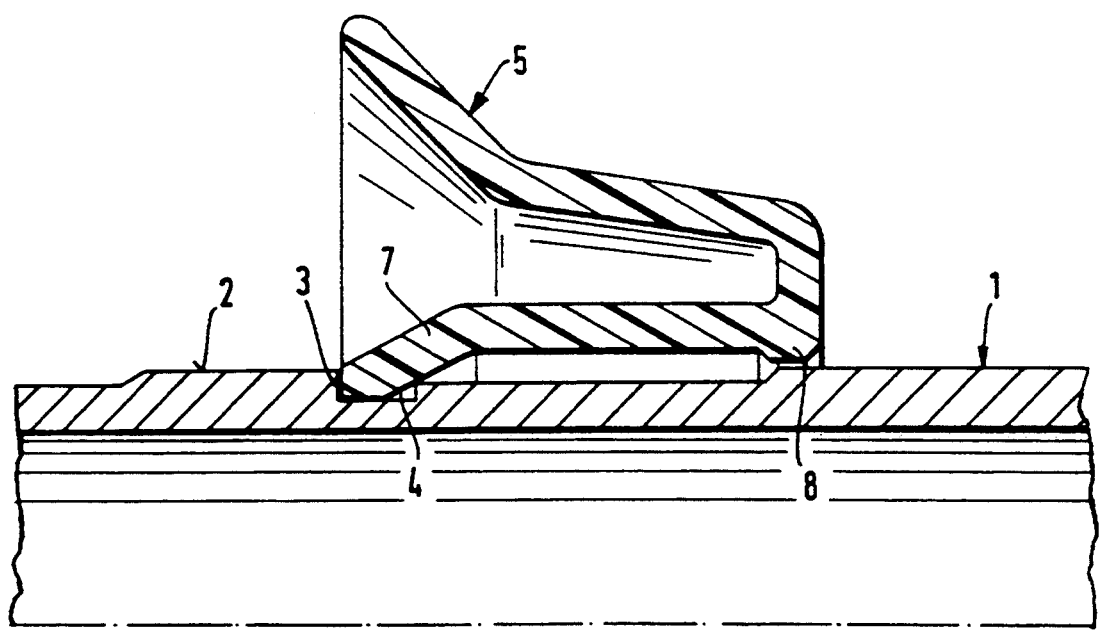
FIG. 8 shows a section along the line VIII—VIII in FIG. 6.

The combination according to the invention of the filling tube and reusable calibrating ring prevents the incidence of cores which cannot be reused or used further. The manufacturer pushes a gathered casing stick onto the filling tube according to the invention, thereafter slips the calibrating ring onto the filling tube, locks it, draws the start of the casing over the calibrating ring, attaches the first clip and can begin filling the casing. After the casing is filled, he takes the calibrating ring down from the filling tube, pushes a new casing stick onto the filling tube and uses the same calibrating ring. The calibrating ring is merely subject to normal wear and should appropriately be exchanged from time to time.

The invention accordingly relates to 1) a filling tube having a locking device for a calibrating ring;
2) a calibrating ring lockable on a filling tube;
3) a filling tube having a removable calibrating ring lockable on the filling tube;
4) a filling appliance for the filling of tubular casings with pasty filling material, which has at least one extruder and one filling tube with a locking device for a calibrating ring;

5) a kit containing at least one gathered tubular casing and one calibrating ring lockable on a filling tube;

6) a process for the filling of tubular casings by the use of a filling tube according to 1) and/or of a calibrating ring according to 2).

The filling tube according to the invention is a conventional filling tube which has been modified to the effect that it has a locking device for a removable calibrating ring lockable on this filling tube. The tube is appropriately produced from stainless steel and has, on the side confronting the extruder, means for fastening to the extruder (for example, a flange) (not shown). The locking device is located on the side facing away from the extruder, near the outlet orifice, preferably in the last eighth of the tube. The locking device must be such that a calibrating ring can be pushed onto the filling tube from the outlet-orifice side of the filling tube and locked on the filling tube in a predetermined position, specifically so that the ring can withstand the frictional force of the casing sliding over and beyond it and is not pushed off from the tube during the unfolding of the gathered casing.

In a preferred embodiment, the locking device includes one or more locking elements distributed around the circumference of the filling tube (1). Each locking element includes a bead (2), a locking shoulder (3), and a locking groove (4). The bead (2) and locking shoulder (3) are raised from the surface of the filling tube (1) and the locking groove (4) is set into the surface. The bead (2) preferably has a triangular profile.

The calibrating ring (5) according to the invention is preferably produced from a thermal plastic and is matched in diameter to the desired diameter of the filled sausage casings. In a preferred embodiment, the ring (5) includes two concentric rings (composite double-ring structure) which are connected on one side and which are U-shaped in axial cross-section. A dish-shaped shoulder is formed on the outer larger ring of the open side of the U, the outside diameter of this shoulder corresponding to the calibrating size of the tubular casing. The shoulder, over which the tubular casing runs during ungathering, is appropriately rounded. The inner ring has, at its point of connection to the outer ring, a continuous guide collar (8) directed to the surface of the filling tube (1). The side of the inner ring axially opposite the guide collar (8) is formed by guide tabs (6) and locking tabs (7) arranged in alternating sequence.

When the calibrating ring (5) is pushed onto the filling tube (1) according to the push-on travel arrow of FIG. 1, the guide tabs (6) slide over the bead (2). As soon as the guide tabs (6) are located behind the locking shoulder (3), the ring (5) can be rotated (through 60° if there are three locking elements) and the locking tabs (7) lock in the locking grooves (4). The calibrating ring (5) is now fixed to such an extent that it withstands the draw-off friction of the unfolding casing running over and beyond it.

While the present invention has been described with reference to certain preferred embodiments, many changes can be made to the described embodiments without departing from the spirit and scope of the invention. All such changes and equivalents are intended to be encompassed by the present invention.

We claim:

1. An apparatus for filling tubular casings, comprising:

a filling tube having a locking device, the locking device including at least one locking element; and a reusable calibrating ring that is lockable on the filling tube and comprising at least one locking tab, at least one guide tab and two concentric rings which are connected on one side and which are U-shaped in axial cross-section wherein the two concentric rings include an outer ring and an inner ring, the outer ring having a diameter larger than the diameter of the inner ring, the outer ring having a dish-shaped shoulder formed thereon at the open side of the U, an outside diameter of the shoulder being equal to a calibrating size of a tubular casing.

2. The apparatus of claim 1, wherein each locking element further comprises a bead, a locking shoulder, and a locking groove.

3. The apparatus of claim 1, further comprising an extruder connected to one end of the filling tube.

4. The apparatus of claim 2, wherein the bead has a triangular profile.

5. The apparatus of claim 1, wherein the filling tube is made of stainless steel.

6. The apparatus of claim 2, wherein the bead and the locking shoulder are raised from the surface of the filling tube and wherein the locking groove is set into the surface.

7. The apparatus of claim 1, wherein the reusable calibrating ring is made of thermal plastic.

8. The apparatus of claim 1, wherein the inner ring has a continuous guide collar directed to a surface of the filling tube at a point of connection to the outer ring, a side of the inner ring axially opposite the guide collar being formed by alternating guide tabs and locking tabs.

9. The apparatus of claim 1, wherein a number of locking elements is 3.

10. An apparatus for receiving filling material from a filling tube, comprising:

a reusable calibrating ring having at least one locking tab and at least one guide tab, the reusable calibrating ring being lockable on the filling tube and comprising two concentric rings which are connected on one side and which are U-shaped in axial cross section wherein the two concentric rings include an outer ring and an inner ring, the outer ring having a diameter larger than the diameter of the inner ring, the outer ring having a dish-shaped shoulder formed thereon at the open side of the U, an outside diameter of the shoulder being equal to a calibrating size of a tubular casing; and a gathered tubular casing that is fitted over the reusable calibrating ring.

11. A method for filling a tubular casing, comprising the steps of:

mounting a gathered casing stick on a filling tube;

sliding a reusable calibrating ring onto the filling tube, the reusable calibrating ring comprising at least one locking tab, at least one guide tab and two concentric rings which are connected on one side and which are U-shaped in axial cross section wherein the two concentric rings include an outer ring and an inner ring, the outer ring having a diameter larger than the diameter of the inner ring, the outer ring having a dish-shaped shoulder formed thereon on the open side of the U, an outside diameter of the shoulder being equal to a calibrating size of the tubular casing;

locking the reusable calibrating ring on the filling tube;

draw a start of the gathered casing stick over the reusable calibrating ring;

introducing filling material into an extruder; and pressing the filling material through the filling tube and into the tubular casing.

12. A filling tube comprising:

a locking device for a reusable calibrating ring, wherein the locking device includes at least one locking element for locking the reusable calibrating ring on the filling tube in a predetermined position; and a reusable calibrating ring comprising at least one locking tab, at least one guide tab and two concentric rings which are connected on one side and which are U-shaped in axial cross section wherein the two concentric rings include an outer ring and an inner ring, the outer ring having a diameter larger than the diameter of the inner ring, the outer ring having a dish-shaped shoulder formed thereon at the open side of the U, an outside diameter of the shoulder being equal to a calibrating size of a tubular casing.

13. The filling tube of claim 12, wherein said at least one locking element includes a bead, a locking shoulder, and a locking groove.

14. A reusable calibrating ring for locking on a filling tube, comprising:

at least one locking tab, at least one guide tab and two concentric rings which are connected on one side and which are U-shaped in axial cross section wherein the two concentric rings include an outer ring and an inner ring, the outer ring having a diameter larger than the diameter of the inner ring, the outer ring having a dish-shaped shoulder formed thereon at the open side of the U, an outside diameter of the shoulder being equal to a calibrating size of a tubular casing.

15. A kit comprising:

a reusable calibrating ring comprising at least one locking tab, at least one guide tab and two concentric rings which are connected on one side and which are U-shaped in axial cross section wherein the two concentric rings include an outer ring and an inner ring, the outer ring having a diameter larger than the diameter of the inner ring, the outer ring having a dish-shaped shoulder formed thereon at the open side of the U, an outside diameter of the shoulder being equal to a calibrating size of a tubular casing; and a filling tube having a locking device for said reusable calibrating ring wherein said locking device includes at least one locking element for locking said reusable calibrating ring on said filling tube in a predetermined position.

16. The kit of claim 15, wherein the at least one locking element includes a bead, a locking shoulder, and a locking groove.

17. A kit comprising:

at least one gathered tubular casing; and a reusable calibrating ring that is lockable on a filling tube and comprising at least one locking tab, at least one guide tab and two concentric rings which are connected on one side and which are U-shaped in axial cross section wherein the two concentric rings include an outer ring and an inner ring, the outer ring having a diameter larger than the diameter of the inner ring, the outer ring having a dish-shaped shoulder formed thereon at the open side of the U, an outside diameter of the shoulder being equal to a calibrating size of a tubular casing.

* * * * *